United States Patent
Kaye et al.

[19]

[11] Patent Number: 6,027,054
[45] Date of Patent: Feb. 22, 2000

[54] SELF-PROPELLED ROUND BALE STRAW BLOWER

[75] Inventors: Clair Kaye; Jonathan Kaye, both of Toledo; Matt Daugherty, Lerna; Mike Houk, Oakland, all of Ill.

[73] Assignee: Lightning Seed Co., Toledo, Ill.

[21] Appl. No.: 09/089,477

[22] Filed: Jun. 2, 1998

[51] Int. Cl.[7] ............................. B02C 21/02; B02C 25/00
[52] U.S. Cl. .................. 241/33; 241/101.74; 241/186.2; 241/186.3; 241/605
[58] Field of Search ................... 241/101.74, 101.76, 241/605, 33, 36, 186.2, 186.3

[56] References Cited

U.S. PATENT DOCUMENTS

| | | | |
|---|---|---|---|
| 2,858,080 | 10/1958 | Couchot | 241/138 |
| 2,952,493 | 9/1960 | Finn | 241/605 X |
| 3,208,491 | 9/1965 | Bliss | 241/186.35 |
| 3,325,106 | 6/1967 | Hoffman, Jr. et al. | 241/163 |
| 4,889,169 | 12/1989 | Peterson et al. | 241/101.7 X |
| 5,033,683 | 7/1991 | Taylor | 241/243 X |
| 5,205,496 | 4/1993 | O'Donnell et al. | 241/34 |

*Primary Examiner*—John M. Husar

[57] ABSTRACT

A self-propelled machine that is used to break apart large round bales of straw and disperse the shredded material on a prepared seed bed. The machine includes an engine for power, a round bale chopper to dismember the round bale, a centrifugal fan and a moveable blower chute at least 9 feet long. The blower chute can move 360 degrees in the horizontal plane and 60 degrees in the vertical plane and allows the operator to very precisely control the amount and placement of the shredded material. A second large round bale can be stored and transported on the machine and can easily be moved into position to be shredded. An operator control chair is located at the right rear of the machine and is capable of controlling every aspect of the machine from the single location.

1 Claim, 10 Drawing Sheets

SELF-PROPELLED ROUND BALE STRAW BLOWER

BACKGROUND—FIELD OF INVENTION

The self-propelled round bale straw blower is an invention that allows landscape contractors to break apart large (1,000 lb.) round bales of straw and disperse the shredded material on to a prepared seed bed.

BACKGROUND—DESCRIPTION OF PRIOR ART

During the course of normal highway construction large areas of soil become exposed and will quickly erode unless they are protected. The most common and least expensive way to prevent soil erosion is to grow ground cover. The first step in this process is to work the soil to create a good seed bed and then disperse seed and fertilizer over the area. Next the area is covered with a mulch material, such as straw or hay, to keep the seed bed moist and prevent weeds from growing. The area covered with mulch will produce grass faster and the mulch insures complete erosion control protection. The procedure of covering the prepared seed bed with mulch involves bringing the mulch material to the job site in one of three forms: small (40 lb.) rectangular bales, large (400 lb.) rectangular bales, or large (1000 lb.) round bales. The small bales (40 lb.) are moved by individuals while the larger bales are moved by a tractor. The current conventional method of straw dispersement uses small bales (40 lb.) with a straw blower such as the B260 or B70TD, as shown in the Finn Corporation 1993 Bulletin, hitched to the back end of a semi-trailer. This is similar to patent U.S. Pat. No. 5,205,496 (Universal Grinder with Reciprocal Feeder) except this machine requires a hook up for a power source as well as locomotion. In both these situations one person drives the semi-trailer while 4–5 men stand on top of the load of small (40 lb.) straw bales and move the straw, by hand, to the blower. Another person runs the controls of the straw blower and directs the straw to the areas that need to be covered. There are several problems with using these current conventional methods of blowing straw including the expense, inaccurate mulch coverage and, more importantly, the creation of unsafe working conditions. Moving the small (40 lb.) bales by hand is expensive because of the amount of time and labor it requires. Also, production time is limited as workers become fatigued. The random order of hand feeding the small (40 lb.) bales into the chopper chute means there are times where there is no straw in the blower. This results in gaps on the ground where straw is still needed. Unsafe conditions occur as the semi-trailer and the operation moves along a roadway to cover the adjacent seedbed. Radio communication must be set up between the blower operator and the semi-trailer driver to make sure the entire operation is not moving to quickly or too slowly. The speed of the mulching operation is slower than the lowest gear on the semi-trailer or truck that is pulling the men and the straw. As a result, the driver must release the clutch and push it back in quickly to not speed up too fast and then coast for a period of time and then repeat the process, causing a momentary jerk of the entire rig to start moving. This momentary jerk creates an unsafe condition for the 4–5 men standing on the unstable footing of the small (40 lb.) straw bales. In the case of patent U.S. Pat. No. 5,205,496, the tube that ejects the straw is limited in its ability to move in the horizontal and vertical plane. Sometimes the machine must be driven off the paved surface to get closer to the area to be covered. This creates an unstable and risky situation for the driver and persons loading the straw bales.

Patent U.S. Pat. No. 5,340,040 is a machine for dispersing straw using large round bales (1000 lb.). This machine requires that a separate tractor to provide power to break apart the round bale. The operator of the tractor would not be able to easily see from that position what soil is being covered with the straw. The tractor with the this machine must be driven close to the soil that is to be covered as the slot that ejects the straw is limited in its ability to move only minimally in the vertical plane. The use of this type of machine results in a slower operation that is less precise in the amount and the placement of straw on the seed bed. The mulch is placed in such varied amounts as to not be acceptable without additional labor to hand move mulch from areas that were covered with too much mulch to areas that were not covered enough. Even with hand moving the mulch to make it the amount of mulch coverage acceptable, the final appearance of the mulch is lumpy and disheveled. This mulch placement using this type of machine is unacceptable for producing a fine quality finished project under any circumstances.

OBJECTS AND ADVANTAGES

Accordingly, several objects and advantages of the self-propelled round bale straw blower are to provide a machine that is safer, allows for better mulch coverage, as well as being self contained. No additional machinery is required for locomotion or power. A single operator can control the machine.

Another object of the present invention is to provide a machine that has a smooth and continuous flow of straw into the machine that the operator can precisely control. The chute where the straw is discharged is high off the ground and extremely long. This allows the operator to reach farther and very precisely disperse the straw to cover the prepared soil. An added benefit of the very long reach of the straw discharge chute is that it allows the equipment to stay on stable, prepared road surface while in operation.

Another object of the present invention is to allow the operator to work for an extended period of time before requiring additional straw to be loaded onto the machine. The machine is able to hold two large round bales (1000 lb. Each). This allows for faster coverage because 2000 lb. of straw can travel with the machine to where it is needed. Another object of the present invention was to have the operator control station equipped with a seat that can be moved with the controls allowing the operator to clearly see how the straw is covering the intended area. Since the single operator controls all motion on the machine, if a small area is missed he can stop the machine, adjust the discharge chute and cover the area immediately. If necessary, the machine can back up immediately. This maneuverability allows for precise coverage of the area and reduces wasted mulch. Another object of the present invention was to provide a machine that can quickly process a large (1000 lb.) round bale. The machine is durable and built to meet the needs of highway construction contractors.

Another object of the present invention was to provide a machine that could easily be moved from job to job. The machine is a self contained trailer and can be towed at highway speeds between projects without requiring special permits or equipment other than a vehicle strong enough to tow the machine. The machine is as wide as a normal vehicle on a roadway. An advantage of this is that the machine can operate on the large shoulders available on interstates without having the equipment in the lane of traffic.

Prior to having the self-propelled large round bale straw blower, the typical working pattern would be to work all day to prepare a large area of soil to be covered by mulch. On the second day of work, 4–5 men would be hired for the day to move the small, rectangular straw bales (40 lb.) by hand to feed the existing mulching machines. In addition, a semi-truck and trailer and driver would be required for the day to move the small, rectangular straw bales (40 lb.) to the area that required mulch. An operator would be required for the mulching machine and would complete the labor required for the mulching operation. Because of the labor intensive operation of mulching the prepared soil, it would not be feasible to prepare a seed bed in the morning and mulch in the afternoon. It would be simply too expensive to have all the labor that is going to move the straw by hand wait until enough soil is prepared for mulching. Therefore, two consecutive days were required to prepare the soil and to apply mulch. Many of the specifications covering seeding operations require that the mulch be applied within 24 hours of the seeding and require re-seeding if this is not accomplished. In many areas of the country, two consecutive days of clear weather can be difficult to forecast accurately. The seeding and mulching operation was dependent upon having a full work day available after the seeding was complete. It was a surprising advantage of the self-propelled large round bale straw blower to be able to prepare the soil and mulch in the same day. The same operator that prepares the soil can operate the self-propelled large round bale straw blower. This allowed us to complete work on one day when rain predicted the following day. We are also able to complete work on Saturday without having to work the following day at higher labor rates. This surprising advantage has proven helpful with the unpredictable weather in the mid-west.

Other objects, advantages and salient features of the present invention will become apparent from the following detailed description, which taken in conjunction with the annexed drawings, discloses a preferred embodiment of the present invention.

DRAWING FIGURES

Referring now to the drawings which form a part of this original disclosure. Closely related figures have the same number but different alphabetic suffixes.

| | |
|---|---|
| 20- | Pindle Hook |
| 22- | Main Frame |
| 24- | Tire |
| 26- | Tie off Ball |
| 28- | Bale Lifter |
| 30- | Gate |
| 32- | Front Wheel Hydraulic Lifter |
| 34- | Hinged Front Well Drive Pivot Arm |
| 36- | Front Continuous Chain Drive Bearing |
| 38- | Direct Drive Chain/Sprocket Upper |
| 40- | Direct Drive Lower Chain/Sprocket |
| 42- | Centrifugal Fan Air Intake Screen |
| 44- | Diesel Fuel Tank |
| 46- | Freewheel Roller |
| 48- | Bale Support Frame |
| 50- | Automatic Seeder Box |
| 52- | Centrifugal Fan Drive Shaft |
| 54- | Chopper Cylindrical Drum |
| 56- | Centrifugal Fan |
| 58- | Chute Control Hydraulic Motor |
| 60- | Blower Chute |
| 62- | Chute Counter Weight |
| 64- | Hydraulic Chute Lifter |
| 66- | Moveable Operator Control Panel |
| 68- | Diesel Engine |
| 70- | Fixed Operator Control Panel |
| 72- | Moveable radiator air intake screen |
| 74- | Main Hydraulic Oil Reservoir |
| 76- | Moveable Operator Chair |
| 78- | Front wheel drive steering linkage |
| 80- | Front Wheel Drive Axle |
| 82- | Front Wheel Hydraulic Motor |
| 84- | Endless Conveyor Flight |
| 86- | Endless Conveyor Chain |
| 88- | Centrifugal Fan Inspection Door |
| 90- | Chopper Power Lower Pulley |
| 92- | Deisel Fuel Tank #2 |
| 94- | Tail Lights and Signals |
| 96- | Direct Drive Roller |
| 98- | Chopper Power Upper Pulley |
| 100- | Moveable Chopper Flail |
| 102- | Non-Moveable Bale Support Tine |
| 104- | Chopper Housing |
| 106- | Chopper Power Engaging Pulley |
| 108-A | Large Round Bale lower position |
| 108-B | Large Round bale elevated position |
| 110- | Water Tank |
| 112- | Spray Nozzle |
| 114- | Hose Tee |
| 116- | Discharge Hose |
| 118- | Flail Cutting Edge |
| 120- | Flail transverse pivot pin |
| 122- | Pair of Flail Lugs |
| 124- | Flail Hook Section |
| 126- | Chute Control Chain & Sprocket System |
| 128- | Front Centrifugal Fan Shaft Bearing |
| 130- | Non-Moveable Bale Support Bed |
| 132- | Hydraulic Chute Lifter support |
| 134- | Centrifugal Fan Housing |
| 136- | Diesel Engine Muffler and Exhaust |
| 138- | Diesel Engine Air Intake Screen |
| 140- | Rear Tire Fender |
| 142- | Freewheel Roller Bearing |
| 144- | Centrifugal Fan Drive Shaft Shroud |
| 146- | Hydraulic Chute Lifter Top Support |

-continued

Reference Numerals in Drawings

147- Flail line at extension
148- Transition Chute
150- Chopper Power Transfer Belts

SUMMARY

In accordance with the present invention, a self-propelled round bale straw blower comprising a body frame having rotatable wheels mounted thereunder for enabling said machine to roll along a surface, an engine mounted in the machine for producing rotational energy from said engine to a drive axle, a chopper system with an aggressive cutting face capable of reducing a formed large round bale of straw into loose pieces of straw capable of moving freely, and a centrifugal fan capable of generating force to move loose pieces of straw mulch material through a discharge chute, and a moveable discharge chute 9 feet or longer capable of moving in both the horizontal and vertical plane, and an operator's control chair located at the right rear of the machine with a means to control all aspects of the machine from within reach of said chair whereby the precise operation of the machine can be directed.

DESCRIPTION—FIGS. 1–5, 10–15

Figure 1:
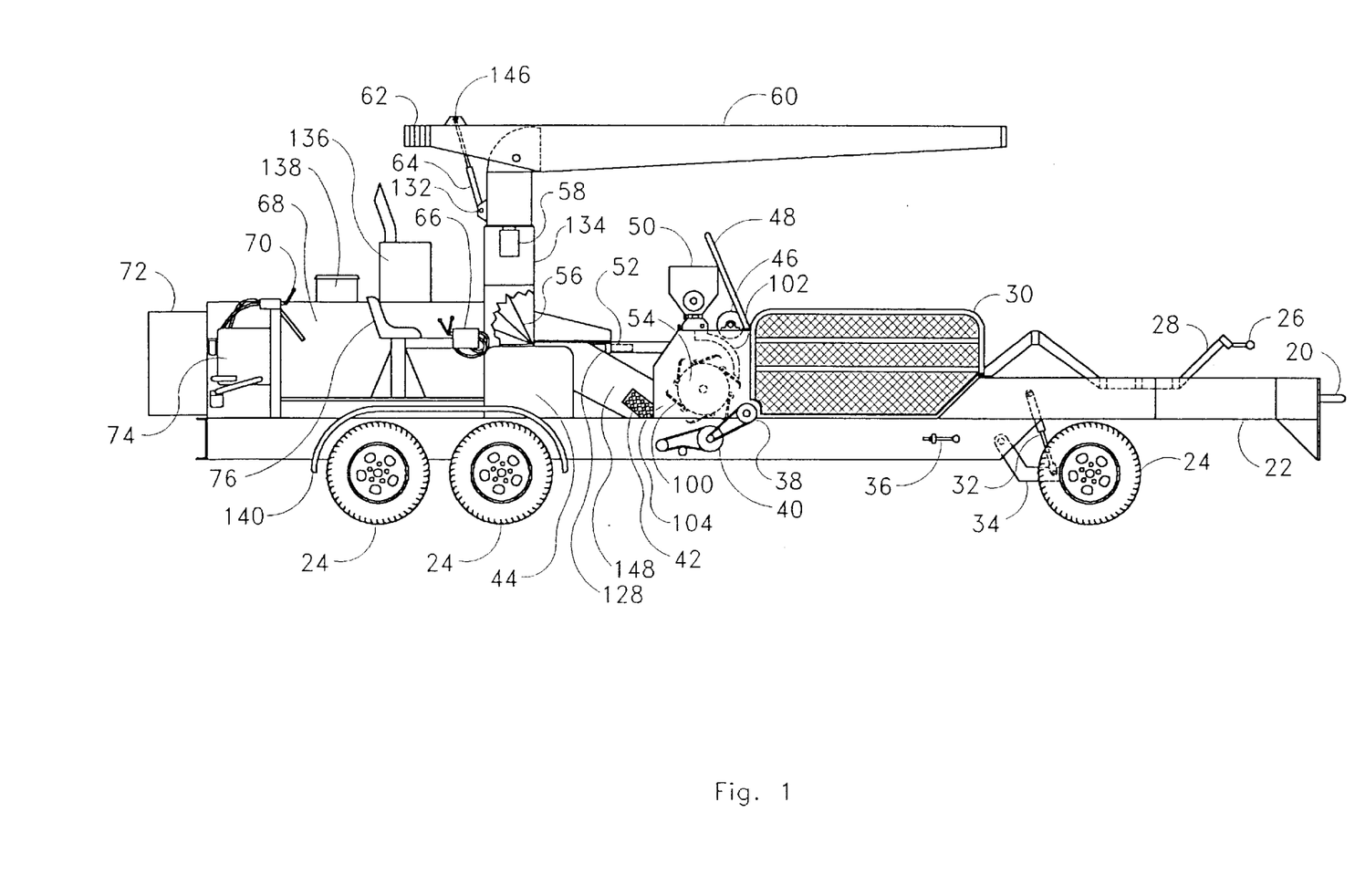
FIG. 1 is a side view of the self-propelled round bale straw blower

FIG. 1 shows the side view of a self-propelled round bale straw blower. A main frame 22 is made of steel I beams (approximately 16") and supports the entire structure. The machine is approximately 28 feet long. A pindle hook 20 is attached to the front of the frame 22. In the front of the machine is a drive axle supported by two tires 24. In the rear of the machine are two axles supported each by two tires 24. A rear axle towing electric brake (not shown) is attached.

At the rear of the machine and mounted on the main frame 22 is a large diesel engine 68 (approximately 190 hp).

The front wheel drive axle 80 (FIG. 2) is attached to the frame by a hinged front wheel drive pivot arm 34 (FIG. 1). Attached to the front wheel drive axle 80 front axle and to the frame of the machine is a front wheel hydraulic lifter 32. The front wheel drive axle 80 is a standard drive axle including a front wheel drive steering linkage 78 and a gear box that is driven by a front wheel hydraulic motor 82.

Above the front wheel drive axle 80 is a bale lifter 28 (FIG. 1). The bale lifter 28 is made of steel and has a tie off ball 26 on the front end of it. The bale litter 28 is made of welded metal in such a position that a large round bale (approximately 6 ft diameter) would be cradled in the frame. The bale lifter 28 is attached to the frame at a pivot point (not shown). Under the bale lifter 28 and also attached to the frame are 2 hydraulic lifters (not shown).

Figure 2:
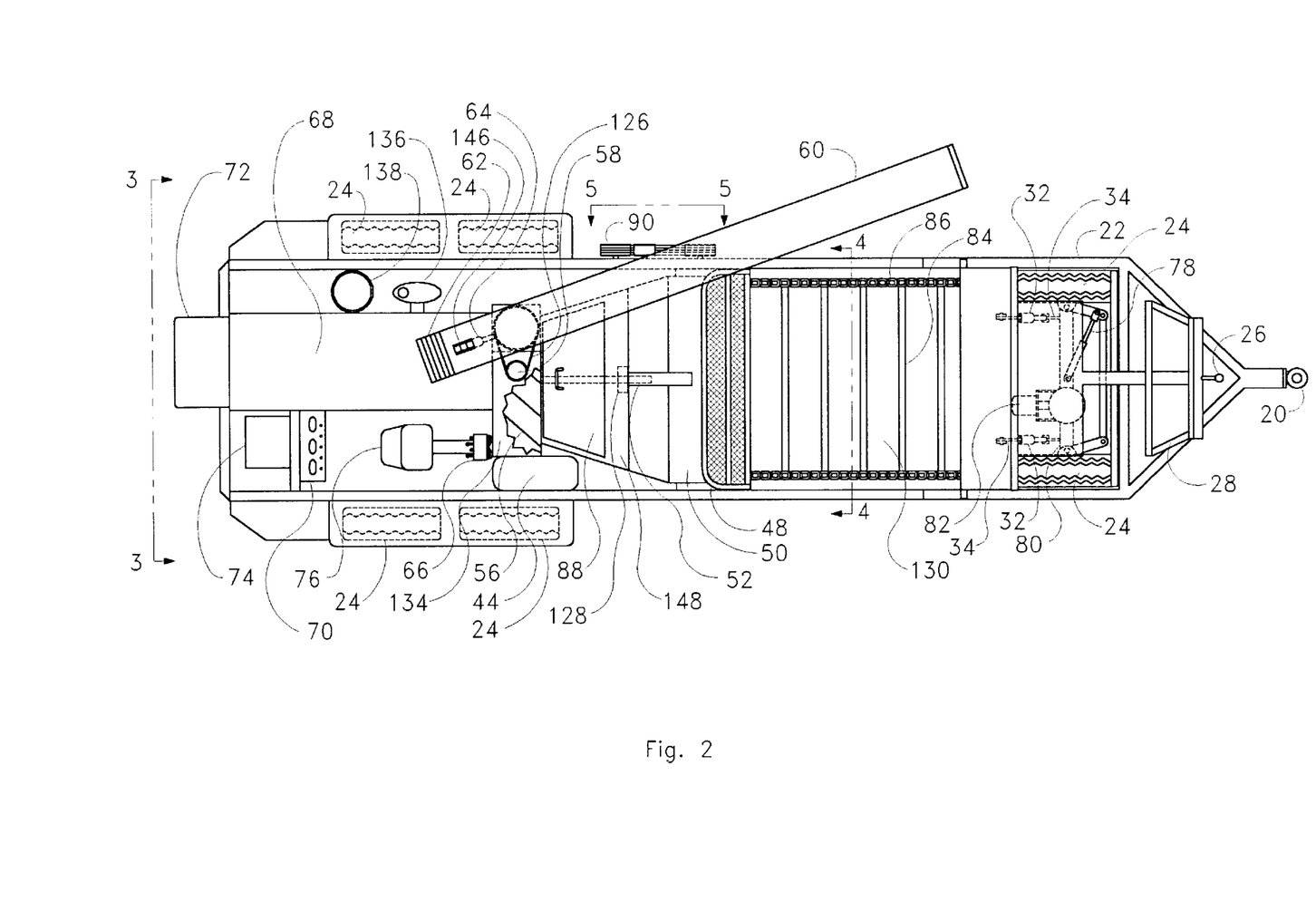
FIG. 2 is a top view of the machine

A pair of gates 30 (FIG. 1) enclose an area containing an endless conveyor. The endless conveyor is made of an endless conveyor chain 86 (FIG. 2) and an endless conveyor flight 84. The endless conveyor chain 86 and flight 84 slide across a non-moveable bale support bed 130. As best seen in FIG. 2, the endless conveyor comprises two opposed endless chains 86 and with a plurality of right-angle iron flights 84 coupled at opposite ends to these chains 86. The flights are essentially perpendicular to the runs of the chains and are each attached at opposed ends by a short rod which is suitable rigidly secured to the flight and to one piece of the chain, such as by welding. At the first end of the support, the chains extend about sprocket wheels which are suitably supported on bearings and rigidly secured to side plates. As seen in FIG. 1, the front continuous chain drive bearing 36 is attached to the frame 22. Similarly, at the second end chains extend around sprocket wheels which are supported on a shaft which is in turn supported for rotation on bearings suitably rigidly supported on the ends of side plates. By so supporting the endless chains, along with the flights, the endless conveyor has a top run across the top surface of support plate 130 and has a bottom run beneath that plate. On the top run of the conveyor, the horizontal leg of each flight 84 rests on the top surface of support plate 130. Attached underneath the endless conveyor is a hydraulic motor suitably connected to the drive sprocket (not shown).

Figure 14:
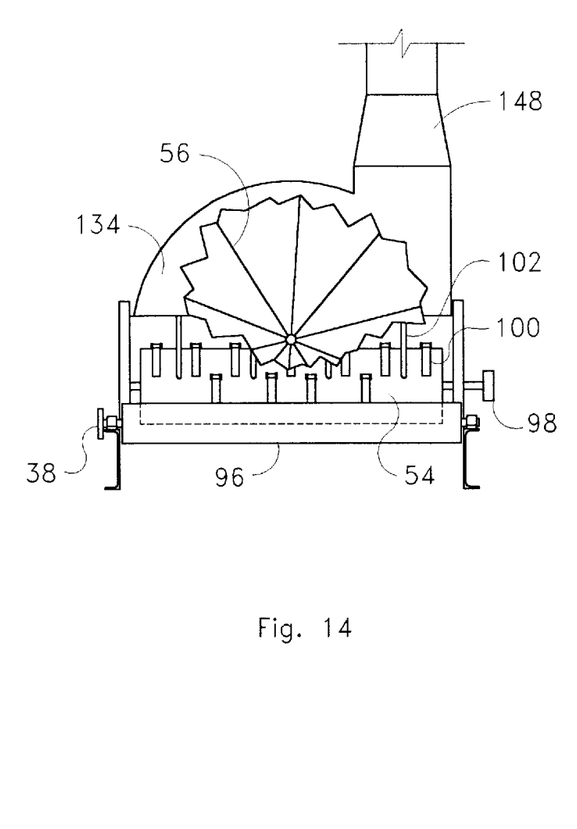
FIG. 14 shows the centrifugal fan in a through-hole looking along the same line 4—4 shown in FIG. 2

The endless conveyor ends at the directly driven roller 96 (FIG. 14). The directly driven roller 96 runs parallel to the flights 84 of the endless conveyor. The directly driven roller 96 is suitably supported on bearings for rotation. One end of the directly driven roller 96 is attached to a chain and sprocket 38 (FIG. 1). The upper direct drive chain and sprocket 38 is attached to a second chain and sprocket 40. This second chain and sprocket 40 is attached to a hydraulic motor. The directly driven roller 96 is just at the beginning of a chopper housing 104.

Figure 4:
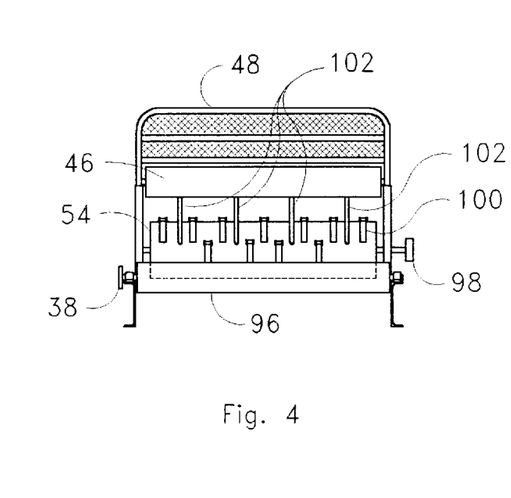
FIG. 4 is a cross-sectional view looking into the chopper housing 104, the cross section being taken along the lines 4—4 of FIG. 2

Looking along the line 4—4 (FIG. 2) shows a chopper housing 104. The chopper housing 104 has the directly driven roller 96 (FIG. 4) along the bottom of the chopper housing 104. Parallel to the directly driven roller 96 and at the top of the chopper housing 104 is a freewheel roller 46. The freewheel roller 96 is suitably supported on bearings 142 (FIG. 6) for rotation on each end. The bearings are rigidly attached to the chopper housing 104. As best shown in FIG. 1, a gate 48 is attached to the top of the chopper housing 104. The gate 48 is in front of the freewheel roller 46 and is angled back towards the freewheel roller 46. As best shown in FIG. 4, the gate has an area cut out of it to allow the freewheel roller 46 to not be blocked by the gate 48.

Figure 13:
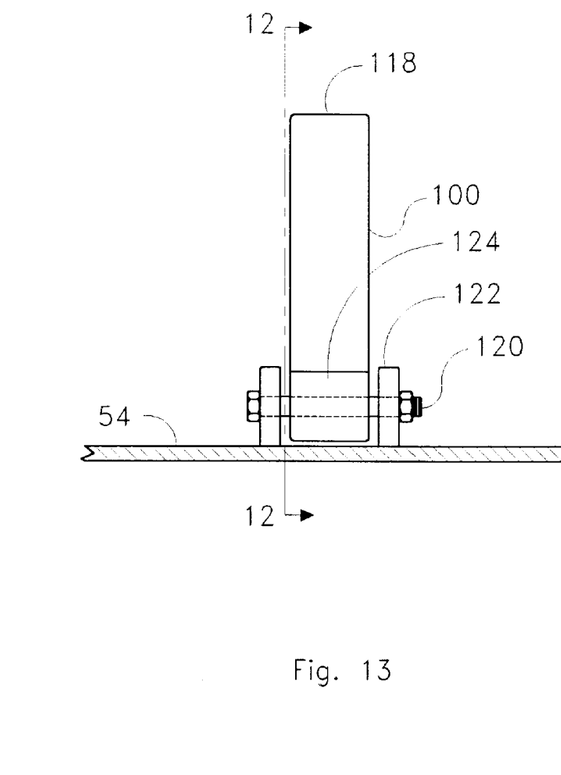
FIG. 13 is a front elevational view of the flail of FIG. 12
Figure 15:
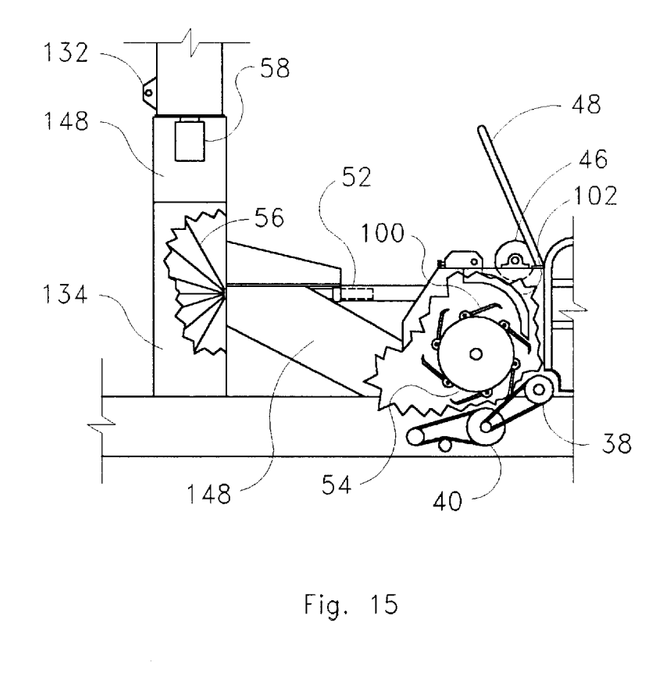
FIG. 15 shows the side view with through-holes showing the chopper cylindrical drum, the transition chute and centrifugal fan Reference Numerals in Drawings

As best seen in FIG. 15, the chopper housing 104 contains a chopper cylindrical drum 54. The chopper cylindrical drum 54 is suitably supported on each end for rotation on bearings suitably rigid and supported at the ends of the chopper housing 104. Attached to the cylindrical drum are moveable chopper flails 100. These flails or chopper blades 100 are attached at numerous evenly spaced points along the chopper cylindrical drum 54. As best seen in FIG. 13, the flails 100 or blades are attached to the chopper cylindrical drum at flail transverse pivot points 120. Each flail transverse pivot point 120 is longitudinal of the chopper cylindrical drum 54.

Figure 5:
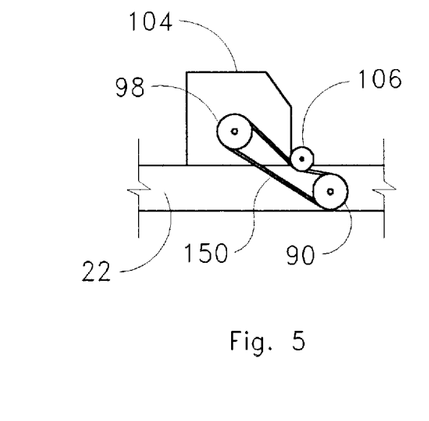
FIG. 5 is a cross-sectional view of the drive mechanism for the chopper cylindrical drum, the cross section being taken along the lines 5—5 of FIG. 2

Looking along the line 5—5 (FIG. 1, FIG. 5)) shows the chopper housing 104 and a chopper power upper pulley 98. The chopper power upper pulley 98 is attached through belts 150 to the chopper power lower pulley 90. A chopper power engaging pulley 106 is attached on a lever arm (not shown) that is driven by a hydraulic motor (not shown). As shown in FIG. 5 the chopper power engaging pulley 106 is in contact with the belts attaching to the upper and lower chopper power pulleys 90 and 98.

As best seen in FIG. 4, four non-moveable bale support tines 102 are attached to the top of the chopper housing 104. These tines 102 are rigid pieces of steel that are positioned in an area not in alignment with a moveable chopper flail 100.

As best seen in FIG. 15, one side of the chopper housing 104 has a transition chute 148. This transition chute is roughly one quarter the size of the inlet side of the chopper housing 104. As seen in FIG. 2 the transition chute also reduces in size as it transitions to the inlet side of a centrifugal fan 56. The transition chute has a centrifugal fan inspection door 88 and a centrifugal fan air intake screen 42.

The centrifugal fan 56 (FIG. 1) is supported by a centrifugal fan drive shaft 52. The centrifugal fan drive shaft 52 is supported by bearings for rotation on each end. As seen in FIG. 15, a front drive shaft bearing 128 is attached to the centrifugal fan drive shaft 52. The front centrifugal drive shaft bearing 52 is attached to cross members (not shown) that support the load of the bearing and keep it suitably rigid. The centrifugal fan drive shaft 52 is enclosed in a shroud 144 that is attached to the back side of the chopper housing 104. The back side of the centrifugal fan drive shaft 52 is attached through a series of pulleys and belts (not shown) to the drive shaft of the diesel engine 68. The entire centrifugal fan 56 is enclosed in a centrifugal fan housing 134.

As best shown in FIG. 14, a second transition chute 148 is positioned on the on the discharge side of the centrifugal fan housing 134. This enclosed chute leads vertically to the blower chute 60. The blower chute 60 (FIG. 1) is approximately 12 feet long. The blower chute 60 is made of steel and has counter weights 62 attached on the back side. A hydraulic chute lifter 64 is attached to the transition chute 148 at the hydraulic chute lifter support 132. The opposite end of the hydraulic chute lifter 64 is attached to the top hydraulic chute lifter support 146. As best seen in FIG. 2, a chute control hydraulic motor 58 is attached to the transition chute 148 with a chain and sprocket 126. This chain and sprocket 126 connection is below the hydraulic chute lifter support 132 (FIG. 1). The transition chute 148 is made up of one circular piece of steel resting within the other circular and slightly larger piece. Roller bearings (not shown) are at the point of contact between these two separate pieces. The total cross-sectional area of the transition chutes 148 have been reduced from the chopper housing 104 through the centrifugal fan 56 to the blower chute 60. The discharge end of the blower chute 60 is approximately 14 inches by 6 inches.

In the rear of the machine is a large diesel engine 68 (FIG. 1). The diesel engine 68 is controlled by a throttle and connected to at least three outputs. The first output is a clutch to which is connected a drive belt which drives a shaft that drives the centrifugal fan 56. The second output is a hydraulic pump connected to hydraulic lines (not shown) to all hydraulically driven parts. Also attached to the shaft of the diesel engine 68 is a moveable air intake radiator screen 72. Also attached to the diesel engine is a muffler 136 and a diesel engine air intake screen 138. A pair of diesel tanks 44 and 92 (FIG. 3) are attached to the frame 22. Tail lights and turn signals 94 are attached to the frame 22. The rear axles are covered by a rear tire fender 140.

Figure 10:
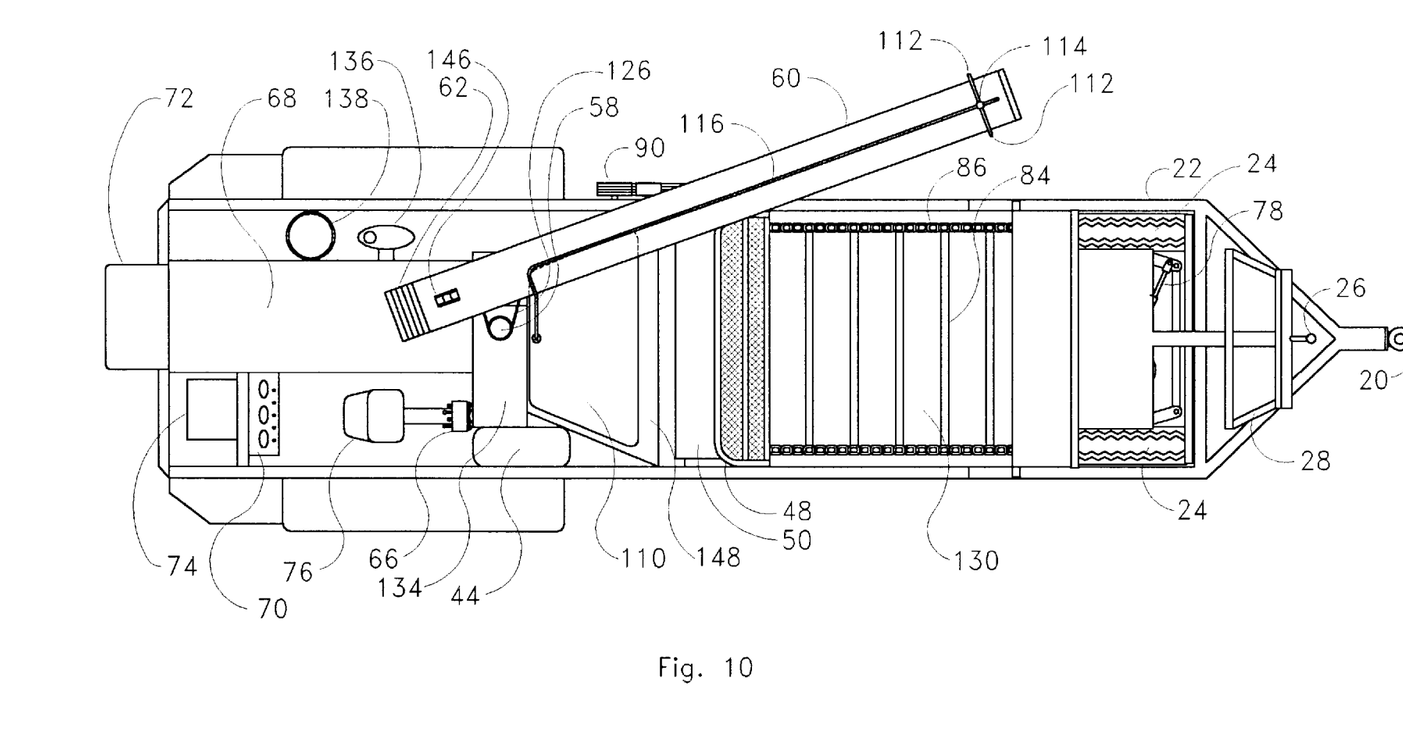
FIG. 10 shows the top view of the machine with (optional) water tank in place.
Figure 11:
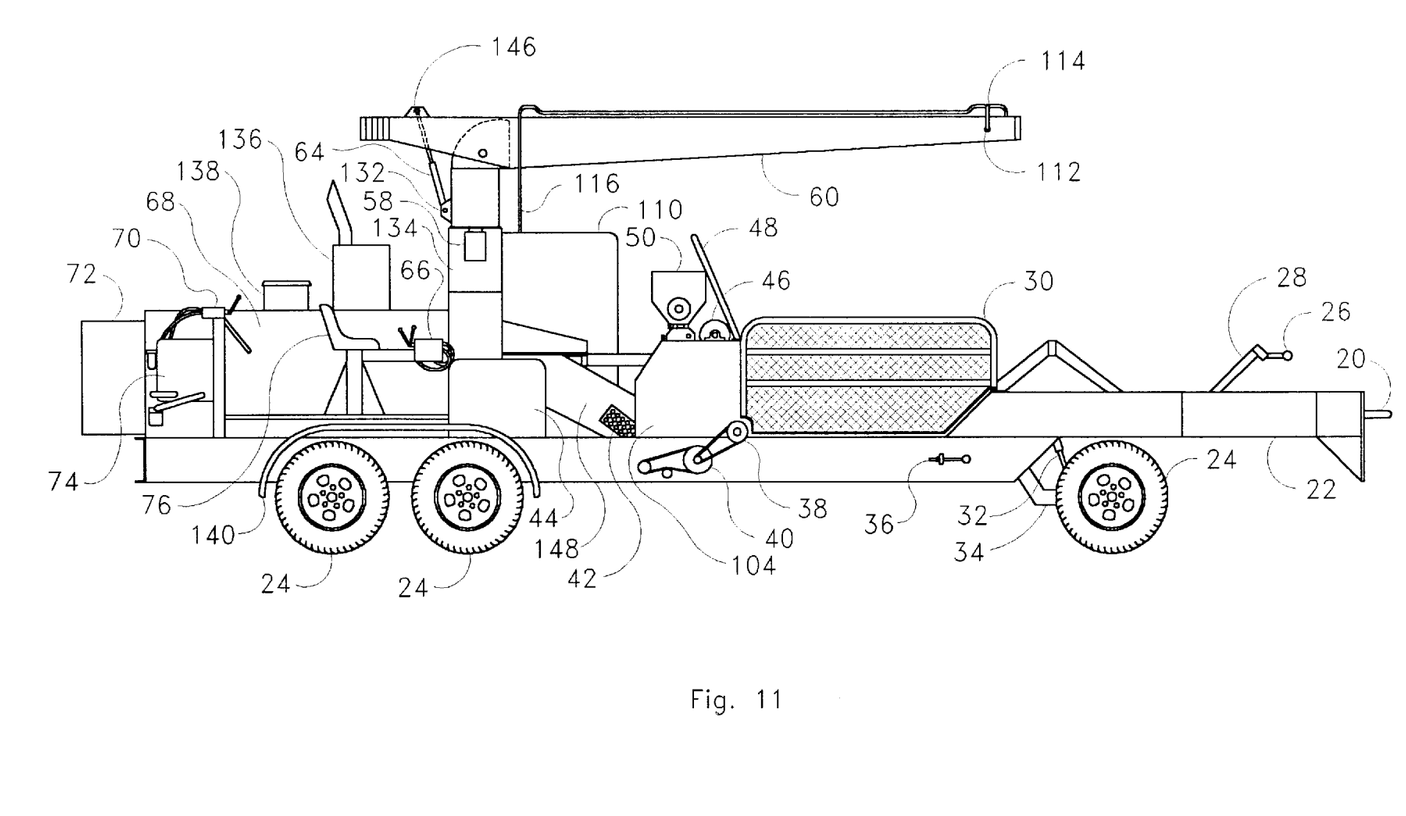
FIG. 11 shows the side view of the machine with (optional) water tank in place

In the rear of the machine and next to the large diesel engine 68 is a moveable operator chair 76. The moveable operator chair 68 has with a moveable operator control panel 66 attached to the chair. A fixed operator control panel 70 is attached towards the rear of the machine. A hydraulic reservoir 74 is mounted to the frame 22 below and to the rear of the fixed operator control panel 70. The operator control panels 66 and 70 allow the operator to control all the moving parts on the machine. The fixed operator control panel 70 also includes the following information gauges: fuel, coolant, oil, battery, engine temperature, revolutions per minute on the diesel engine, rpm on the chopper cylindrical drum, electric brake on/off Additional embodiments are shown in FIGS. 1, 10 and 11. In FIG. 1 an automatic seeder box 50 is attached to the top of the chopper housing 104. The automatic seeder box 50 has an auger (not shown) that runs parallel to the chopper cylinder drum 54. An adjustable opening (not shown) is at the bottom of the automatic seeder box 50 and the top of the chopper housing 104. A hydraulic motor (not shown) attaches to the automatic seed box auger. Auger is suitably supported on each end by bearings (not shown) that allow for rotation of the auger.

As best seen in FIG. 11, a water tank 110 is attached to the frame of the machine. The water tank 110, has a pump (not shown) that attaches to discharge hose 116 that feed to the end of the blower chute 60. As best shown in FIG. 10, discharge hose 116 connect through a hose tee 114 to two spray nozzles 112. The spray nozzles 112 are mounted such that the discharge of the nozzle sprays is in through a hole in the side of the blower chute 60.

OPERATION—FIGS. 6–9

The manner of using the self-propelled round bale straw blower to break apart large round bales of straw and disperse the shredded material on a prepared seed bed will now be described. The word 'straw' is used generically to refer to any shreddable material. FIG. 1 shows the side view of the machine. The machine is approximately 28 feet long. The machine has a large diesel engine (approx. 190 hp) that is the source of power. The machine is self-propelled and is capable of traveling under its own power at speeds up to approximately 5 miles per hour.

Figure 9:
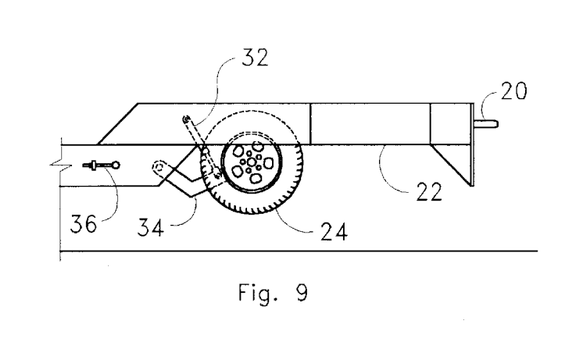
FIG. 9 shows the front wheel drive axle in a retracted position for towing.

FIG. 9. Operation Of Moveable Front Axle—When the machine is being moved from project to project, a pindle hook 20 is used to hook the machine to a truck for towing at highway speeds on the rear axles. Electric brakes (not shown) are attached to the rear axles to allow the machine to assist in stopping when being towed. The front axle 80 is the drive axle for the machine. As best shown in FIG. 9, the front axle 80 is capable of being lifted off the ground so as to not be in contact with the road when being towed. The front axle 80 is connected to the frame by a hinged front wheel drive pivot arm 34 (FIG. 9). The front axle is also attached to a front wheel hydraulic lifter 32 that when activated lifts the front axle 80. The front wheel drive pivot arm 34 allows the front tires 24 to move up and cease to have contact with the roadway. Because the front wheel drive system is not in contact with the roadway when being towed, the rear axles allow the machine to be towed at highway speeds. The machine is not required to be loaded on to a separate trailer to transport the machine from project to project.

Figure 7:
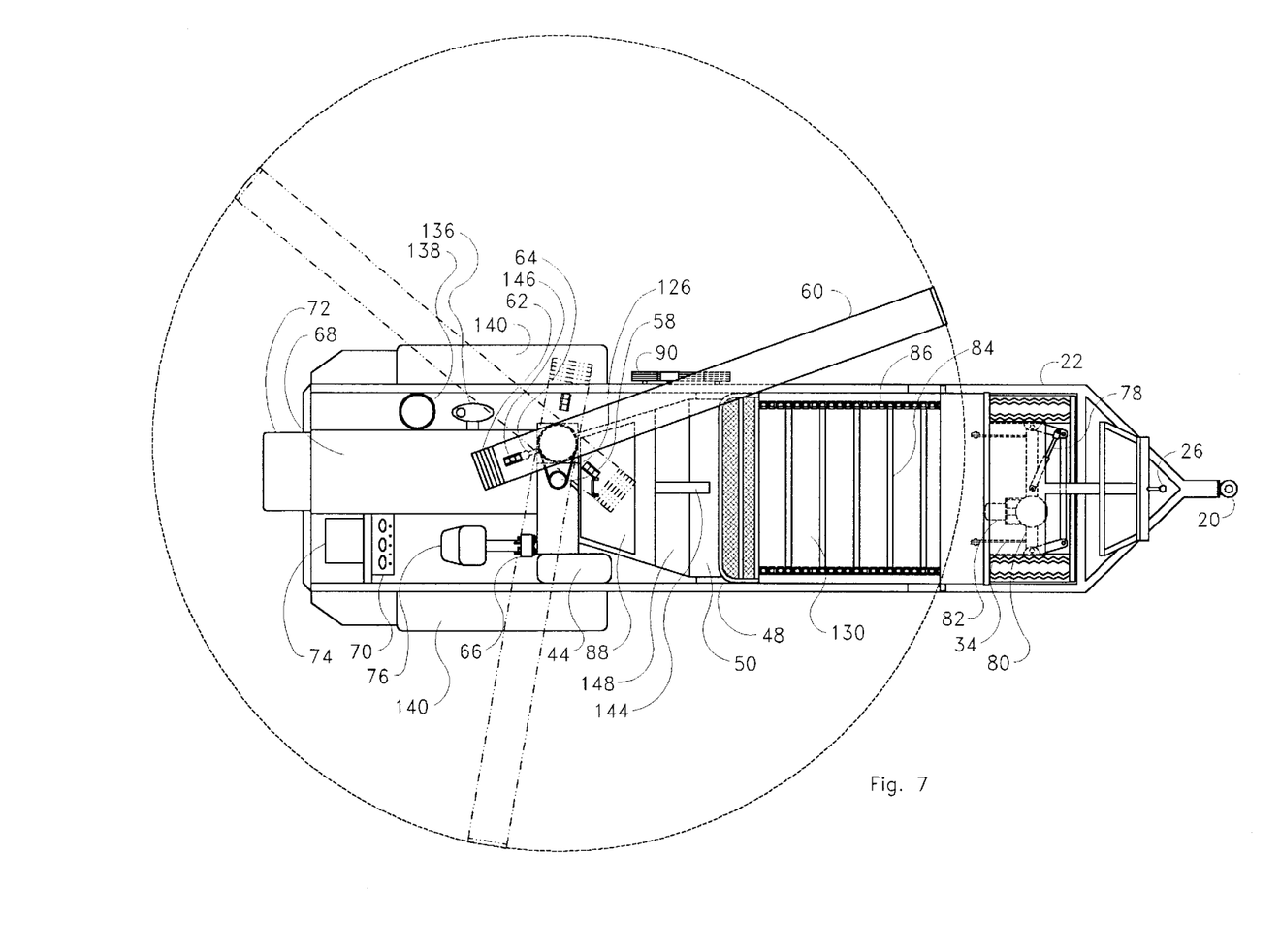
FIG. 7 shows the blower chute in various horizontal positions

FIG. 7 Operation of Front Wheel Drive Axle—The self-propelled round bale straw blower is driven by it's front axle 80 when not in tow. The hydraulic motor 34 drives a standard front wheel drive axle 80 including the gear box. Front wheel drive steering linkages 78 are controlled by the operator to turn the tires 24 to the right or left for steering. An operator controls the speed of the front wheel drive by controlling the amount of hydraulic pressure generated in the hydraulic motor. The machine is capable of moving forward or backwards and can be steered to the right or left as controlled by the operator from the moveable operator chair 76.

Figure 8:
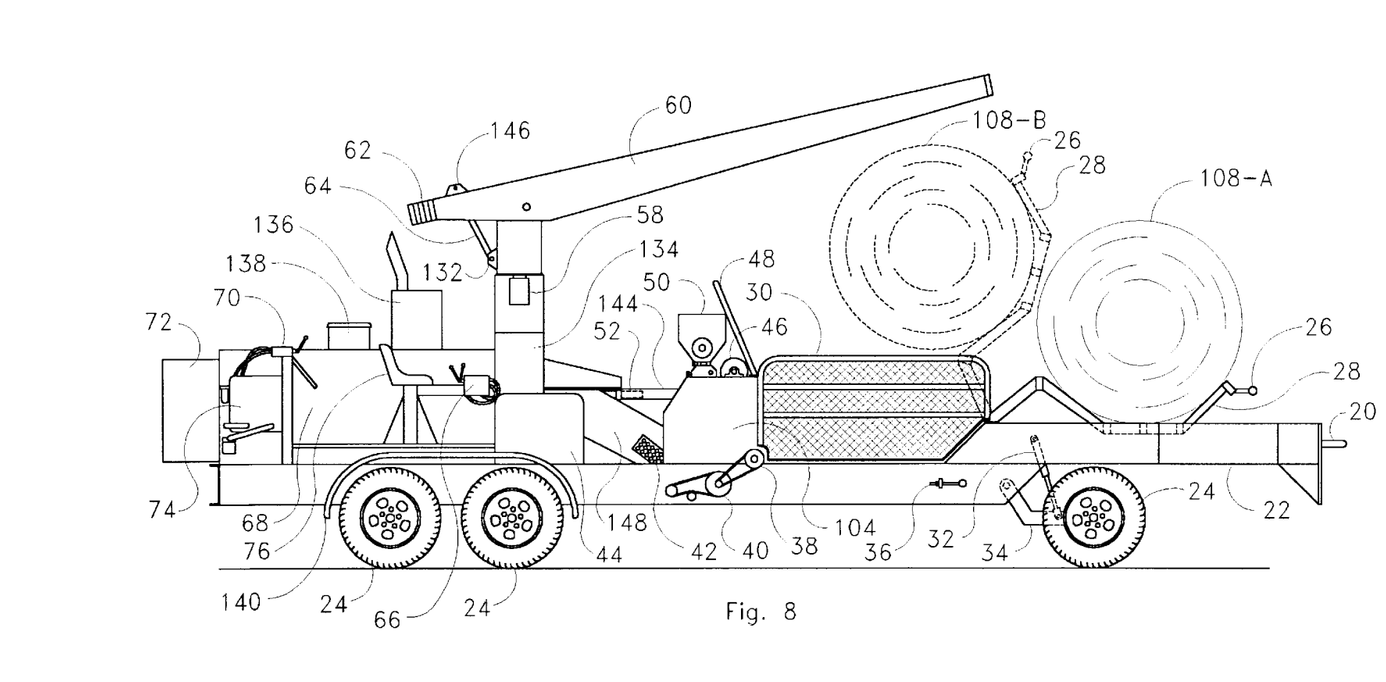
FIG. 8 is a side view of the machine with a large round bale shown in two different positions.

FIG. 8 Operation of Bale Lifter—A large round bale (approximately 6 ft diameter and 1000 pounds) 108-A is loaded into the bale lifter 28 by another machine (not shown) such as a tractor with a bucket and a spear or a forklift. All large round bales are held together by some sort of wrapping material. This wrapping can vary widely and includes twine, plastic rope, plastic mesh wrapping and others. Depending on the type of the Wrap material, the operator can choose to cut the wrap material horizontally across the side of the bale and wrap the loose end of the wrapping material around the tie off ball 26. Many wrapping materials are such that this step is not necessary. Once a large round bale 108-A is in the bale lifter 28, the operator can engage the hydraulic bale lifters (not shown) and cause the bale lifter 28 to pivot about a pivot point (not shown). The final position of the large round bale 108-B is elevated. The angle of the bale lifter 28 at full extension coupled with the slope of the bale lifter 28 cause the center of gravity of the large round bale to shift. The result is the bale 108-B will drop under its own weight onto the endless conveyor chain 86 and flights 84 and the non-moveable bale support bed 130.

FIG. 7 Endless Conveyor Operation—Once a large round bale is in position resting on top of the non-moveable support bed 130, the large round bale will also be resting on the endless conveyor chain 86 and flights 84. The large round bale will also be enclosed on each side by the pair of gates 30. These gates 30 can be opened by lifting up a release lever (not shown) and allowing the gates 30 to rotate about a pivot point (not shown). These gates 30 allow access to the bale as well as the machine parts enclosed by the gates 30. The operator can engage a hydraulic motor (not shown) that drives the sprocket (not shown) that is in contact with the endless conveyor chain 86. The sprockets are held by bearings that support the sprockets while rotating. The endless conveyor chain 86 begins moving and thereby, moves the horizontal flights 84. The movement of the endless conveyor chain 86 and the flights 84 cause the bottom of the large round bale to move towards the chopper housing 104. The base of the large round bale will come in contact with the directly driven roller 96 (FIG. 14).

FIG. 15 Operation of the Directly Driven Roller 96—The base of the large round bale is being forced into contact with the directly driven roller 96 by the operation of the endless conveyor chain 86 and flights 84. The directly driven roller 96 is controlled by the operator by adjusting the hydraulic pressure to a hydraulic motor (not shown) that is connected to a chain and sprocket 38. The directly driven roller 96 is support at each end for rotation by bearings. A second chain and sprocket 40 (FIG. 1) are driven by the first chain and sprocket 38. This second connection allows hydraulic motor (not shown) to be mounted in a position that is out of the way of the chopper housing 104. As shown in FIG. 15, the directly driven roller 96 is generally turned in a counter clockwise direction. This motion, in combination with the operation of the endless conveyor chain 86 and flights 84, causes the large round bale to rotate in a clockwise direction. The top of the large round bale will come in contact with the freewheel roller 46. As the large round bale is rotating clockwise, the freewheel roller 46 is free to move in a counterclockwise direction to not impede the motion of the large round bale. The large round bales when tied with a wrapping material tend to be held in a tighter diameter than they would be without the binding. When the bale wrapping is cut free either by the operator or through contact with the chopper flails 100, the gate 48 above the freewheel 46 helps to keep the straw from falling towards the operator over the chopper housing 104.

Figure 12:
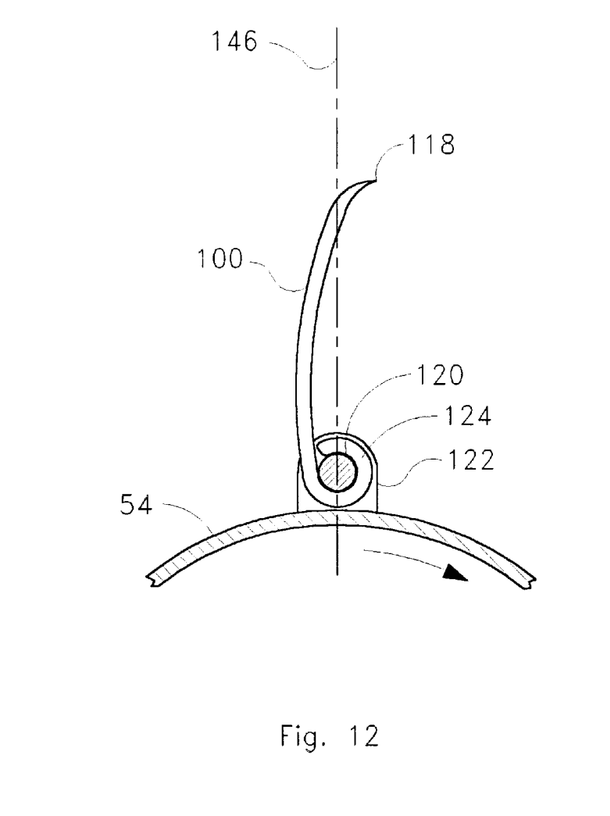
FIG. 12 is a cross-sectional view through one part of the disintegration member showing one of the flails, the cross section being taken along the lines 12—12 of FIG. 13

FIGS. 1, 5, 12, 13 and 15 Operation of Dismembering the Large Round Bale—The large round bale is now presented to the opening of the chopper housing 104 and it is rotating away from the chopper housing 104. The chopper cylindrical drum 54 is supported by bearings on each end for rotation. Looking along the line 5—5 (FIG. 1), the chopper cylindrical drum 54 is driven by a an upper 98 and lower pulley 90 belt system. The upper 98 and lower pulleys 90 are at rest until the chopper power engaging pulley 106 is made to be in contact with the belt between the upper 98 and lower pulley 90. A hydraulic motor (not shown) turns the chopper power engaging pulley 106. A spring lever (not shown) that is controlled hydraulically by the operator determines when the chopper power engaging pulley is in contact with the belts or not. When in contact, the chopper pulleys (upper 98 and lower 90) rotate to drive the chopper cylinder drum 54. The chopper cylinder drum 54 can be made to move in either direction of rotation along its axis. Attached to the chopper cylinder drum 54 (FIG. 13) are a plurality of flail lug 122 pivot points each having a pivot axis longitudinal of the drum 54. Moveable chopper flails 100 are secured with a flail transverse pivot pin 120 through the flail hook section 124 (FIG. 12). This attachments method allows the moveable chopper flails to be under the control of gravity when the chopper cylinder drum 54 is at rest. When the chopper cylinder drum 54 is turning at such a speed that each flail 100 is controlled by centrifugal force the moveable chopper flail 100 will be roughly be along the line 147 (FIG. 12). Each flail 100 includes a sharp flail cutting edge 118 (FIG. 13). The sharp edge 118 of each flail 100 is lying in a plane generally longitudinal of the drum. The combination of the plurality of the moveable chopper flails 100 attached to the chopper cylindrical drum 54 in motion creates an aggressive cutting face presented to the large round bale. The non-moveable bale support tines 102 are located such that only when the moveable chopper flails 100 are positioned along the line 146 (FIG. 12) do they make contact with the large round bale. This maintains an aggressive cutting face without allowing the moveable chopper flails 100 to come in contact with too much material at any one time. The result is the moveable chopper flails 100 engage and grasp the contact face of the large round bale as the chopper cylinder drum 54 rotates. The result of this action is to have loose pieces of straw in the chopper housing 104. The action of the rotation of the chopper cylinder drum 54 causes the cut straw to be slung around to the transition chute 148.

FIG. 15—Operation of Centrifugal Fan—Once the straw has been cut and is near the transition chute 148, the straw comes under the power of the vacuum created by the rotating centrifugal fan 56. The transition chute 148 also reduces in size to increase the venturi effect of the vacuum created by the centrifugal fan 56. The inspection door 88 on the transition chute 148 can be opened to inspect the centrifugal fan 56 when the machine is not in operation. The drive shaft of the diesel engine 68 is attached to a series of pulleys and belts (not shown) to transfer the power of the drive shaft of the engine to run the centrifugal fan 56. The operator controls the speed of the fan by controlling the revolutions per minute of the diesel engine 68. The fan is supported on either end by bearings that allowing rotation. The centrifugal fan 56 is enclosed in housing 134 that keeps the cut straw moving towards the second transition chute 148 (FIG. 14) that is positioned at the discharge of the centrifugal fan 56.

Figure 6:
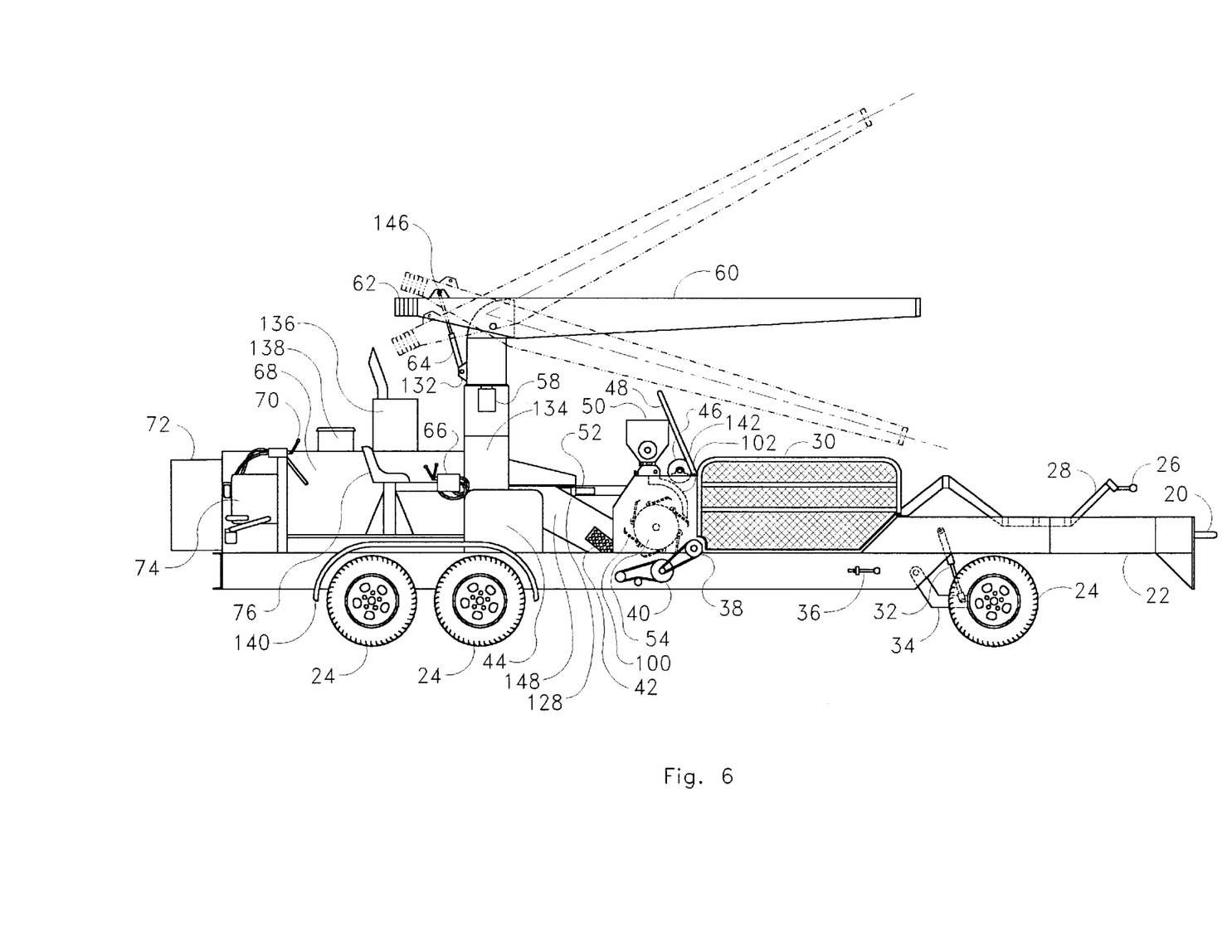
FIG. 6 shows the blower chute in various vertical positions

FIG. 6 and 7 Operation of Blower Chute—The force of the cut straw being propelled through the centrifugal fan 56 allows the straw to travel at a high rate of speed out the blower chute 60. The blower chute 60 (FIG. 6) is approximately 12 feet long. The taper to the blower chute results in even more force being applied to the cut straw by the time it is discharged through an area of 14 inches by 6 inches. The length and weight of the blower chute 60 requires that counter weights 62 support the blower chute 60 and allow it to move freely. A hydraulic cylinder 64 is attached to the transition chute 148 at the hydraulic chute lifter support 132. The opposite end of the hydraulic chute lifter 64 is attached to the top hydraulic chute lifter support 132. The operator can engage this hydraulic chute lifter 64 and move the blower chute 60 in the vertical plane encompassing approximately 60 degrees of movement. The blower chute can be moved to +30 degrees to −30 degrees from horizontal. The height of the blower chute where the transition chute 148 attaches is high enough that in combination with the power of the centrifugal fan 56 and the length of the blower chute 60 results in the greatest possible distance that the straw can be directed. The chute control hydraulic motor 58 is attached to the transition chute 148 with a chain and sprocket 126. As seen in FIG. 7, this chain and sprocket 126 allows the operator to move the blower chute 360 degrees in the horizontal plane. The blower chute is able to rotate by being nested within a slightly larger circular piece of steel with roller bearings (not shown) to allow rotation between the two different circular pieces.

Figure 3:
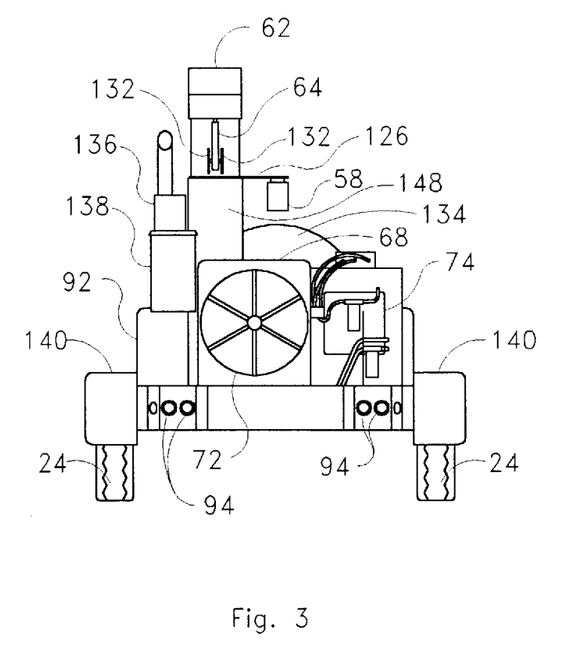
FIG. 3 is a cross-sectional view of the rear view of the machine, the cross section being taken along the lines 3—3 of FIG. 2

FIG. 7 Operation Of Diesel Engine—The large diesel engine runs on the fuel in the diesel tanks 44 and 92 (FIG. 7 and 3). The diesel engine drives the moveable air intake radiator screen 72. This rotating screen keeps any loose straw would normally stick to the radiator intake from causing the engine to overheat. The rotation of the screen 72 creates more centrifugal force than the vacuum that is created by the radiator air intake (not shown). Straw will not stick to the moveable air intake radiator screen 72. The diesel engine 68 is controlled by a throttle and drives a hydraulic pump (not shown) that pressurizes the hydraulic fluid used throughout the machine.

FIG. 6 Operation of Operator Controls—The moveable operator chair 76 is attached to the moveable operator control panel 66. This chair is able to move with the respective controls to face completely forward or backward. The moveable operator chair 76 along with the associated control panel 66 can move 180 degrees in the horizontal plane. This movement of the control panel 66 along with the chair 76 means that the operator can always have the best position to see how the straw is coming, out of the blower chute and how it is being affected by the wind. When controlling a machine such as this in the open air, it is critical that the operator be able to control every facet of operation with split second response time. The wind shifts directions relentlessly and in combination with the area to be covered requires an operator to be able to change the output of the machine to result in a precise covering of straw over the prepared seed bed. The reach of the machine and the degree with which one person truly controls every facet of the operation while the operator can clearly see the area being covered results in a much more even and complete straw coverage than any other method available on the market today. The single operator can control every moving part on the machine from one position. The position is exactly aimed to give the operator maximum viewing of the area to be covered.

FIGS. 1, 10 and 11 Additional Embodiments—Additional embodiments are shown in FIGS. 1, 10 and 11. In FIG. 1 an automatic seeder box 50 is attached to the top of the chopper housing 104. Seed is poured into the automatic seeder box 50 through an opening at the top. An auger (not shown) that runs parallel to the chopper cylinder drum 54 makes the seed distribute evenly in the automatic seeder box 50. Seed falls through an adjustable opening in the bottom of the automatic seeder box 50 and into the chopper cylinder housing 104. Seed will be drawn by vacuum through the transition chute 148, centrifugal fan 56 and discharged through the blower chute 60. This operation can be independent of the mulching operation or can be performed at the same time as the mulching operation.

FIG. 10 and 11 Additional Embodiments Straw Tackifier—A number of different seeding specifications require that the contractor stabilize the straw mulch. The most common method of stabilizing straw mulch is to drive over the mulch with a tractor (not shown) that has an attachment that anchors the straw into the soil. The attachment anchors the straw into the soil by means of a mechanical stabilizer(not shown) with dull blades or disks (not shown). This mechanical stabilization method is acceptable if you are able to drive on the mulched area. When you are unable to drive on the mulched area due to either the accessibility of the terrain or the moisture level in the soil, a preferred method of stabilizing the straw is to apply a tackifier to the straw. The tackifier can be emulsified asphalt or a chemical mulch binder. Both tackifiers are a sticky liquid that can be pumped. As best seen in FIG. 11, a water tank 110 is attached to the frame of the machine. The water tank 110, has a pump (not shown) that attaches to discharge hose 116 that feed to the end of the blower chute 60. As best shown in FIG. 10, discharge hose 116 connect through a hose tee 114 to two spray nozzles 112. The spray nozzles 112 are mounted such that the discharge of the nozzle is in the blower chute 60 but the nozzle is not in the blower chute 60. The sticky liquid tackifier is pumped from the tank 110 through the discharge hose 116 and to the spray nozzles 112. The tackifier is sprayed onto the discharge chute 60 so that the mulch that is being pushed out of the discharge chute 60 will have a sticky consistency. Once this straw is on the ground, the tackifier helps hold the mulch in place in case of rain or wind.

SUMMARY, RAMIFICATION AND SCOPE

Thus the reader will see the self-propelled round bale straw blower provides a powerful tool for a landscape contractor to break apart large round bales of straw and disperse the shredded material on a prepared seed bed. With the location of the moveable operator control chair, the machine can truly be run by one operator. The operator is able to control every facet of the machine and can clearly see from the vantage point of the operator control chair the straw being dispersed and how it is covering the prepared soil. The height and reach of the blower chute in combination with the continuous flow of straw being fed into the chopper housing and the numerous controls allow for very precise straw coverage. This makes the finished project look very uniform and consistent and professional. This also saves on the amount of straw required to complete the project saving additional material costs. The machine holds two large round bales (1000 lb.) simultaneously allowing the operator to work for a long period of time before stopping to have additional straw loaded in the machine. The heavy duty design of the machine is suitable to meet the needs of highway construction contractors. Because the front wheel drive axle retracts, the machine can be towed from project to project at highway speeds. This is a great advantage because no special equipment is required to move the machine from project to project and as towed the machine easily meets all the weight, height and length limits for traveling in tow on federal highways and secondary roads. The cost to purchase the large round straw bales (1000 lb.) is less expensive than the cost to purchase the small, rectangular straw bales (40 lb.). The ability to seed and mulch in the same day with the same labor makes the machine very cost effective. The flexibility of being able to prepare the soil and mulch in the same day saves working days over the previously available machinery.

While my above description contains many specific items, these should not be construed as limitations on the scope of the invention, but rather as an exemplification of one preferred embodiment thereof. Many other variations are possible, for example changing the straw intake system to allow for large, rectangular straw bales (400 lb.) to be used in addition to the large round straw bales (1000 lb.). Accordingly, the scope of the invention should be determined by the embodiment(s) illustrated, but by the appended claims and their legal equivalents.

We claim:

1. A self-propelled round bale straw blower, comprising:
   a. a body frame having rotatable wheels mounted thereunder for enabling said machine to roll along a surface, and
   b. a chopper system with an aggressive cutting face capable of reducing a formed large round bale of straw into loose pieces of straw capable of moving freely, and
   c. an engine mounted in the machine for producing rotational energy from said engine to a drive axle and the chopper system as described in (b),
   d. a centrifugal fan capable of generating force to move loose pieces of straw mulch material through a long discharge chute and continue on the path of direction aimed by the long moveable discharge chute to distances up to at least 200 feet, and
   e. a long moveable discharge chute 9 feet or longer capable of moving 360 degrees in the horizontal and 60 degrees in the vertical plane, and
   f. an operator's control chair located at the right rear of the machine with the means to control the following items:
      1) the speed and direction the rotatable wheels as described in (a), and
      2) the speed and direction of the chopper system as described in (b), and
      3) the speed of the drive axle as described in (c), and
      4) the speed and direction of the chopper system as described in (b), and
      5) the location in a 360 degree horizontal plane of the long discharge chute and the location in the vertical plane in the range of +30 degrees to −30 degrees from horizontal plane of the long discharge chute as described in (e) by transferring the power through the use of a hydraulic motor allowing the operator to control quick changes in direction and location of the long discharge chute from the operator's control chair,
   g. a body frame that is propelled forward solely under the power of the machine by means of hydraulic motor connected to a drive axle in the front of the machine,
   h. a body frame capable of holding a 2nd large round bale and hydraulics to control the lifting of this 2nd large round bale.

* * * * *